(12) United States Patent
Stucker

(10) Patent No.: US 6,706,997 B1
(45) Date of Patent: Mar. 16, 2004

(54) METHOD AND APPARATUS FOR DRILLING HIGH TOLERANCE HOLES WITH LASER PULSES

(76) Inventor: David E. Stucker, 119 S. Vine St., Plainsfield, IN (US) 46168-1237

(*) Notice: Subject to any disclaimer, the term of this patent is extended or adjusted under 35 U.S.C. 154(b) by 0 days.

(21) Appl. No.: 10/444,350

(22) Filed: May 23, 2003

Related U.S. Application Data

(60) Provisional application No. 60/383,264, filed on May 24, 2002.

(51) Int. Cl.⁷ ............................................... B23K 26/38
(52) U.S. Cl. ................................................ 219/121.71
(58) Field of Search ........................ 219/121.6, 121.61, 219/121.65, 121.66, 121.7, 121.71, 121.72, 121.85

(56) References Cited

U.S. PATENT DOCUMENTS 4,870,244 A * 9/1989 Copley et al. ........... 219/121.7
6,340,806 B1 * 1/2002 Smart et al. ........... 219/121.62

OTHER PUBLICATIONS

D.K. Dijken, W. Hoving and J. TH. M. De Hosson, "Laser Penetration Spike Welding: A Microlaser Welding Technique Enabling Novel Product Designs and Constructions," Journal of Laser Applications, vol. 15, No. 1, Feb., 2003, The Netherlands.

* cited by examiner

Primary Examiner—Samuel M. Heinrich
(74) Attorney, Agent, or Firm—C. John Brannon; Bingham McHale LLP

(57) ABSTRACT

A method for producing a precision-machined workpiece using a pulsed laser assembly, wherein a laser pulse is produced with the pulsed laser assembly and subsequently directed through the workpiece. The laser pulse includes a first relatively low energy portion and at least two relatively high-energy micro-pulses subsequent to the first relatively low energy portion. The pulsed laser assembly includes a pulse generator, a lasing pump operationally connected to the pulse generator, and at least one switch operationally connected to the pulse generator and the lasing pump. The switch is synchronized with the pump pulse and actuates the separation of the laser pulse into a plurality of discrete micro-pulses.

37 Claims, 4 Drawing Sheets

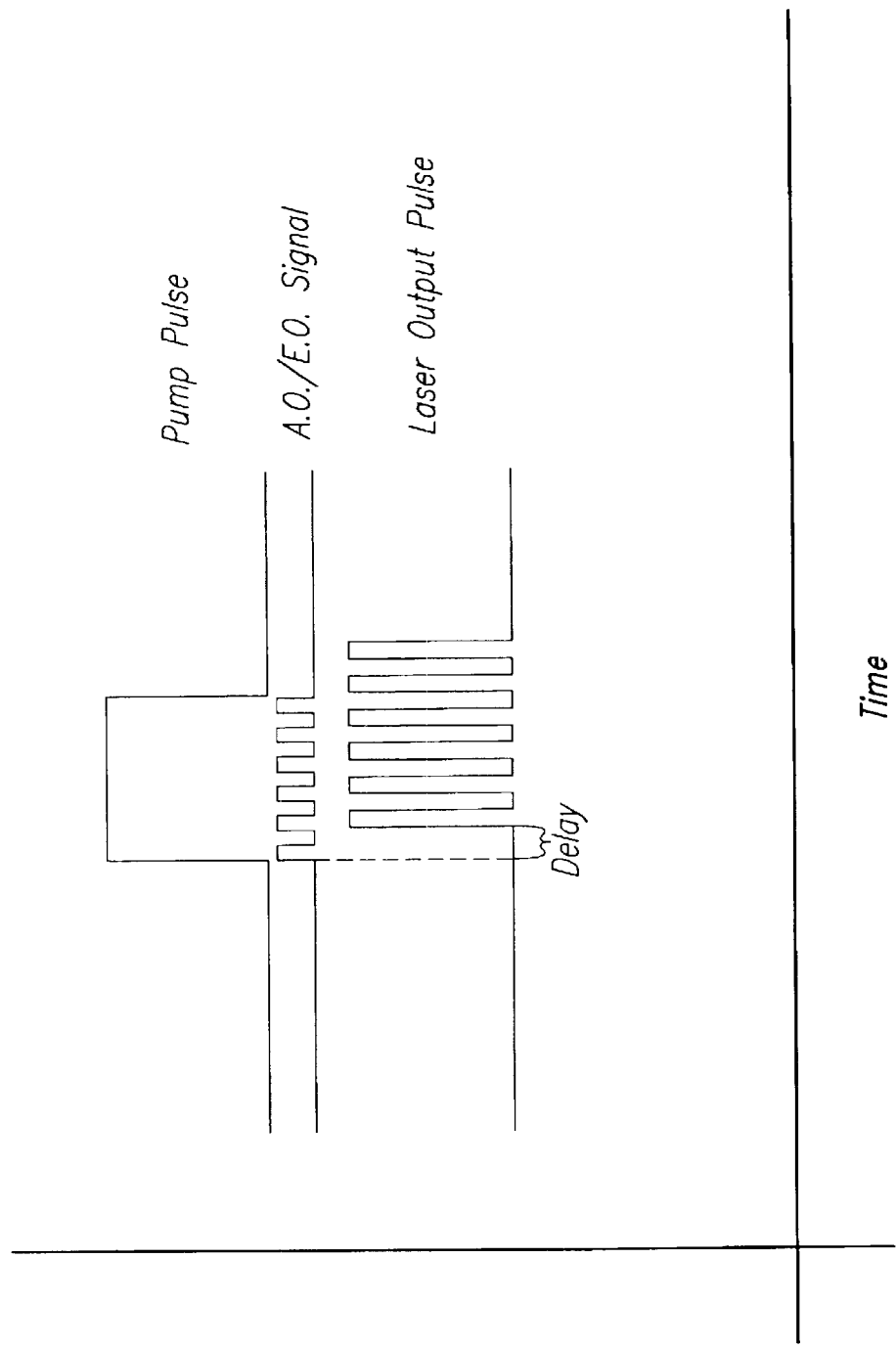

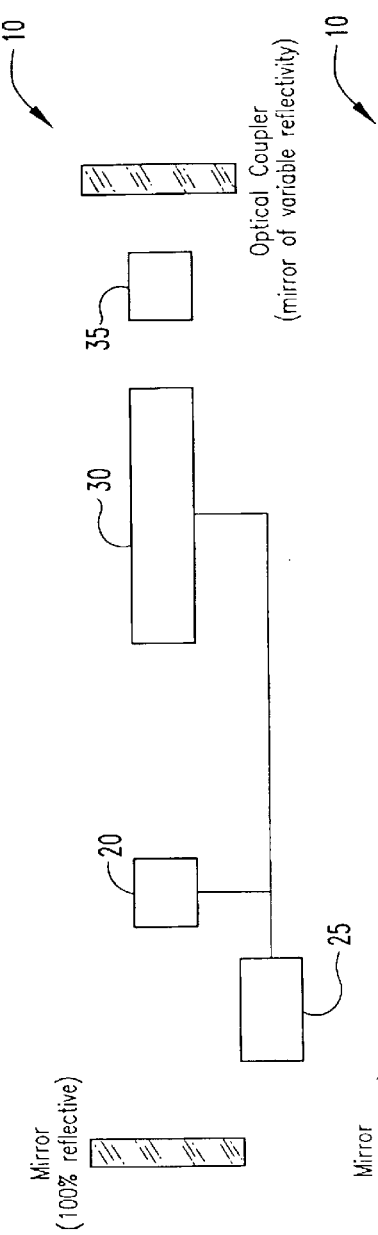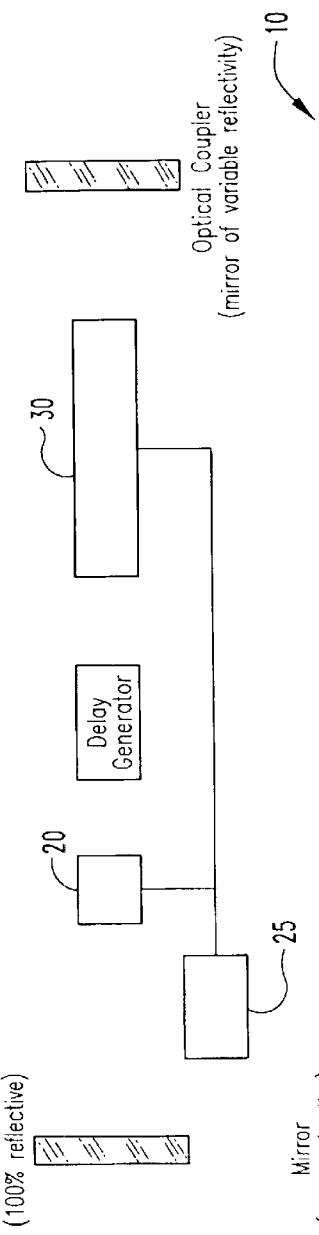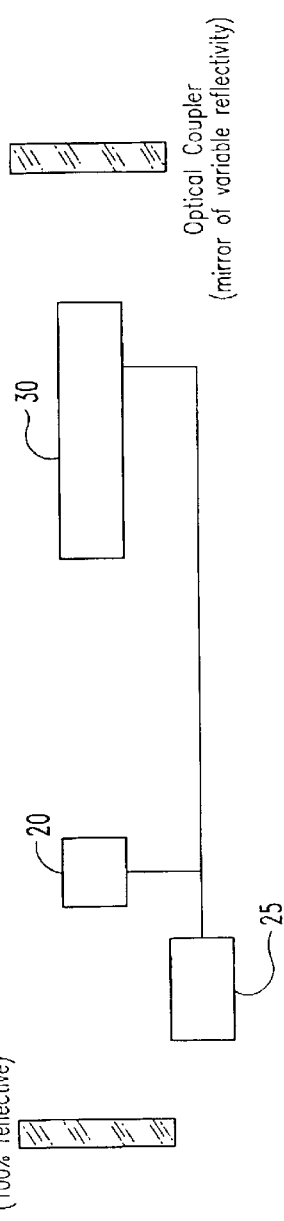

METHOD AND APPARATUS FOR DRILLING HIGH TOLERANCE HOLES WITH LASER PULSES

REFERENCE TO RELATED APPLICATION

This application claims priority to U.S. Provisional Patent Application Ser. No. 60/383,264 filed May 24, 2002.

TECHNICAL FIELD OF THE INVENTION

The present invention relates to a method and apparatus for producing a laser pulse having a relatively low initial energy followed by a number of high energy spikes or variation thereof for use, as an example, in drilling workpieces, especially thin workpieces such as metal layers, with holes having dimensionally accurate entrance and exit shapes with close tolerances. The invention can be applied to the high speed manufacture of products requiring fine tolerances, such as injector spray holes, filter screens, cooling apertures, valve seats, dies and molds or various other applications requiring cutting or welding.

BACKGROUND OF THE INVENTION

Since the 1970's, laser techniques have garnered increasing interest in the field of materials processing. Early laser techniques for material processing, such as cutting and drilling applications involved using continuous wave or relatively long pulse length (i.e., from about 0.5 to about 20 milliseconds) lasers such as $CO_2$, ruby and yttrium aluminum garnet (YAG) lasers. These systems suffered the drawback of requiring a relatively high radiant exposure of the workpiece and resulted in significant alterations to surrounding material. Consequently, the lasers of these systems were effective cutting tools mainly in applications that did not require a high degree of precision or control.

In the 1980's, the erbium doped YAG laser yielded encouraging results by demonstrating the capacity to perform as an efficiently drilling laser while incurring relatively low levels of collateral damage to the surrounding workpiece material, provided that low pulse rates of less than about three pulses per second were applied to the target material. These Er:YAG systems, operating in the microsecond pulse duration regime, have been successfully applied with minimal attendant thermal damage to the surrounding material in several areas of application in material processing and medicine. The combination of high absorption, relatively short pulse duration and low pulse repetition rates enables minimization of collateral workpiece damage for those workpieces having high absorption at the Er:YAG wavelength of 2900 nm. However, in addition to the disadvantage of being effective for precision machining use only with a narrow range of workpieces highly absorbent around 2900 nm, these systems also suffer the drawbacks of having low material removal rates arising from the relatively limited average energy output.

Although the removal rate problem may be addressed by increasing the pulse energy or the pulse repetition rate of the laser, enhancing material removal by increasing laser power is accompanied by increased photothermal and photomechanical effects which cause collateral damage in adjacent material, reducing the effectiveness of the laser as a precision machining tool. When used to drill precision holes, such high-energy laser pulses result in the exit hole being produced not by the laser pulses themselves but by molten and/or vaporized workpiece material exploding through the exit surface. The geyser of workpiece material erupting through the exit surface can result in an exit surface exhibiting far greater damage than the surface adjacent the entrance hole, making the use of pulsed or continuous wave high power lasers less attractive for drilling and/or cutting in situations where both precision entrance and exit holes are desired. Further, high volumetric material removal rates are typically achieved through the use of high laser pulse rates, which lead to considerable thermal and mechanical collateral damage, as discussed above. In addition, increasing power leads to plasma decoupling of the beam, e.g., incident laser energy is wasted in heating the ambient in front of the target. This is inherent to the process regardless of the laser type or wavelength chosen and thus leads to a manipulation of the energy within the applied laser pulse to yield higher material removal rates.

Additional possibilities for the application of lasers to the field of machining include the use of excimer lasers that emit high intensity pulses of ultraviolet (UV) light as cutting and/or drilling tools. Both the short wavelength characteristic of the UV light and the short nanosecond range pulse durations arising from the excimer lasers contribute to a different regime of laser-workpiece interaction. Short wavelength ultraviolet photons are energetic enough to directly break chemical bonds in a wider range of workpiece materials. As a consequence, UV excimer lasers can often vaporize a material target with minimal thermal energy transfer to adjacent workpiece material. The resultant ablatant (the vaporization product) is ejected away from the target surface, leaving the target relatively free from melt, recast, or other evidence of thermal damage. However, when used to drill precision holes, such high-energy laser pulses result in the exit hole being produced not by the laser pulses themselves but by molten and/or vaporized workpiece material exploding through the exit surface. The geyser of workpiece material erupting through the exit surface typically results in an exit surface exhibiting far greater damage than the entrance hole, detracting from the use of pulsed excimer lasers for drilling and/or cutting in situations where both precision entrance and exit holes are required. Further, high volumetric material removal rates are typically achieved through the use of high laser pulse rates, which lead to considerable thermal and mechanical collateral damage, as discussed above. However, it should be recognized that lasers in the UV wavelength machine some materials preferably to others, such as the polymers PFTE and PMMA versus the various steels, and the methods of UV laser machining are typically masks imaged onto the workpiece.

Laser machining tools have been used to machine organic, inorganic, metals and nonmetals such as ceramic materials, but have been largely commercially unsuccessful over the broad materials range due to their inability to produce the desired fine tolerances in commercial products such as valve seats, dies and molds and their tendency to degrade the substrate material due to the formation of microcracks. Typically, strength of the laser-machined parts is reduced considerably due to the formation of microcracks in the workpiece during the laser machining process. These microcracks are caused by thermal expansion and rapid cooling at the surface of the material exposed to and heated by the laser beam. These microcracks also serve as fracture initiators and result in fracturing or catastrophic failure of the workpiece during subsequent use.

Various other laser-machining techniques are known in the art. For instance, U.S. Pat. No. 4,638,145, issued Jan. 29, 1987, describes a laser machining apparatus for performing high quality cuts on plate type work pieces wherein the laser output is varied according to the traversing speed of the laser beam. The object is to minimize burn-through loss when machining soft steel workpieces. The output and velocity of the laser are controlled according to a predetermined formula dependent on the thickness and type of material. This referenced patent does not address the problem of precision machining of hard materials or permit the production of fine-machined finishes.

Currently, the lasers used for the bulk of machining or material processing applications are typically high-power solid-state lasers. These high-power solid-state lasers are typically used in a pulsed mode of operation for workpiece machining applications, such as cutting, welding and drilling. Ideally, lasers used for this purpose should have variable pulse lengths and variable pulse formats. For these applications, the pulse length typically selected is in the range of about 0.4 ms to about 1 ms, achieved through the duration of the applied pump source to the gain medium.

Typically, well-designed solid-state lasers produce pulses at a natural relaxation oscillation frequency when subjected to a short burst of pump energy. Various configurations have been proposed to provide control of the width, peak intensity, and spacing of laser relaxation output pulses. Control can be effected either by modulating the laser itself or by controlling laser pumping, which inputs energy to the laser cavity. Intracavity laser modulation usually requires the selective insertion of losses in the cavity to suppress lasing. A conventional Q-switch, for example, operates periodically to suppress lasing completely while the device continues to be pumped, and then suddenly removes the inserted loss and switches the laser on, which allows a large pulse to be emitted by the laser. When lasers are operated in a pulsed mode by means of conventional electro-optic (E.O.) Q-switching, the pulse length obtained is approximately 5–50 ns (nanoseconds), which is usually too short for most machining operations, and the pulses typically have a peak intensity that is too high for precision machining use. However, acousto-optic (A.O.) Q-switching results in longer length pulses that still exhibit high peak intensity, but are suitable for precision machining applications.

Conversely, free running, long pulse length lasers produce pulses with insufficient intensity for efficient precision cutting and drilling applications. Control of laser output by controlling the duration and timing of pumping energy also affords a degree of control of the output pulse waveform. For well-designed solid-state lasers, which produce output pulses at the natural relaxation oscillation (R.O.) frequency, control of the pumping duty cycle results in "macro-pulses" of laser output, each of which contains subpulses of rapidly decreasing intensity at the natural relaxation oscillation frequency. Solid-state lasers have typically been pumped by flash lamps, and now diodes, which, when pulsed, provide pumping energy that produces a laser pulse that varies widely in intensity over its time duration. Initially, the laser pulse is at peak intensity and then drops off toward the end of the pulse. These R.O. subpulses contained within this laser "macro-pulse" have a variation in peak intensity and are, therefore, generally unsuitable for precision tool applications.

Various prior art patents, such as U.S. Pat Nos. 3,747,019 and 4,959,838, have disclosed relatively complex techniques for modulating the laser output to achieve a more desirably uniform sequence of output pulses. These techniques require some form of control system wherein the output beam is monitored and used to feed back a modulator control signal. Basically, the feedback control systems are needed because variations in the laser pump rate require commensurate variations in the modulation rate to maintain stable operation and produce the desired output pulse characteristics. However, sequential modulation of output pulses does not significantly improve the machining precision of the laser, especially with regard to the entrance surface topography of laser-drilled holes or laser cut sections (i.e., incident surface damage). For example, holes drilled or cut by conventional high-power solid-state lasers still suffer from "dirty" entrance and exit surfaces formed as a result of molten or gaseous workpiece material redepositing upon the workpiece surface to form uneven, imprecise surface topography assocated with such a surface penetration mechanism. Likewise, laser welds formed through the use of conventional high-power solid state lasers also suffer from incident surface damage arising from the redepostoion of desolidified workpiece material around the weld seam, defining an upper limit to the precision to which the weld may be made. It will therefore be appreciated that there is still a significant need for improvement in the field of high-power lasers suitable for industrial use in precision drilling and machining applications. The present invention addresses this need.

SUMMARY OF THE INVENTION

The present invention relates to a method and apparatus for producing a machined workpiece. The method includes the steps of producing a laser pulse and directing the laser pulse throught the workpiece. The laser pulse is characterized by a first relatively low energy portion and at least two relatively high-energy spikes subsequent to the first relatively low energy portion.

One object of the present invention is to provide an improved laser machining process. Related objects and advantages of the present invention will be apparent from the following description.

BRIEF DESCRIPTION OF THE DRAWINGS

FIG. 2 is a graph showing the relation between a laser pump signal, the Q-switching signal and the resultant spiked laser output pulse according to the embodiment of FIG. 1.

FIG. 3A is a schematic representation of a first embodiment of a laser system for producing the laser pulse of FIG. 1.

FIG. 3B is a schematic representation of a second embodiment of a laser system for producing the laser pulse of FIG. 1.

FIG. 3C is a schematic representation of a third embodiment of a laser system for producing the laser pulse of FIG. 1.

DETAILED DESCRIPTION OF THE PREFERRED EMBODIMENTS

Figure 1:
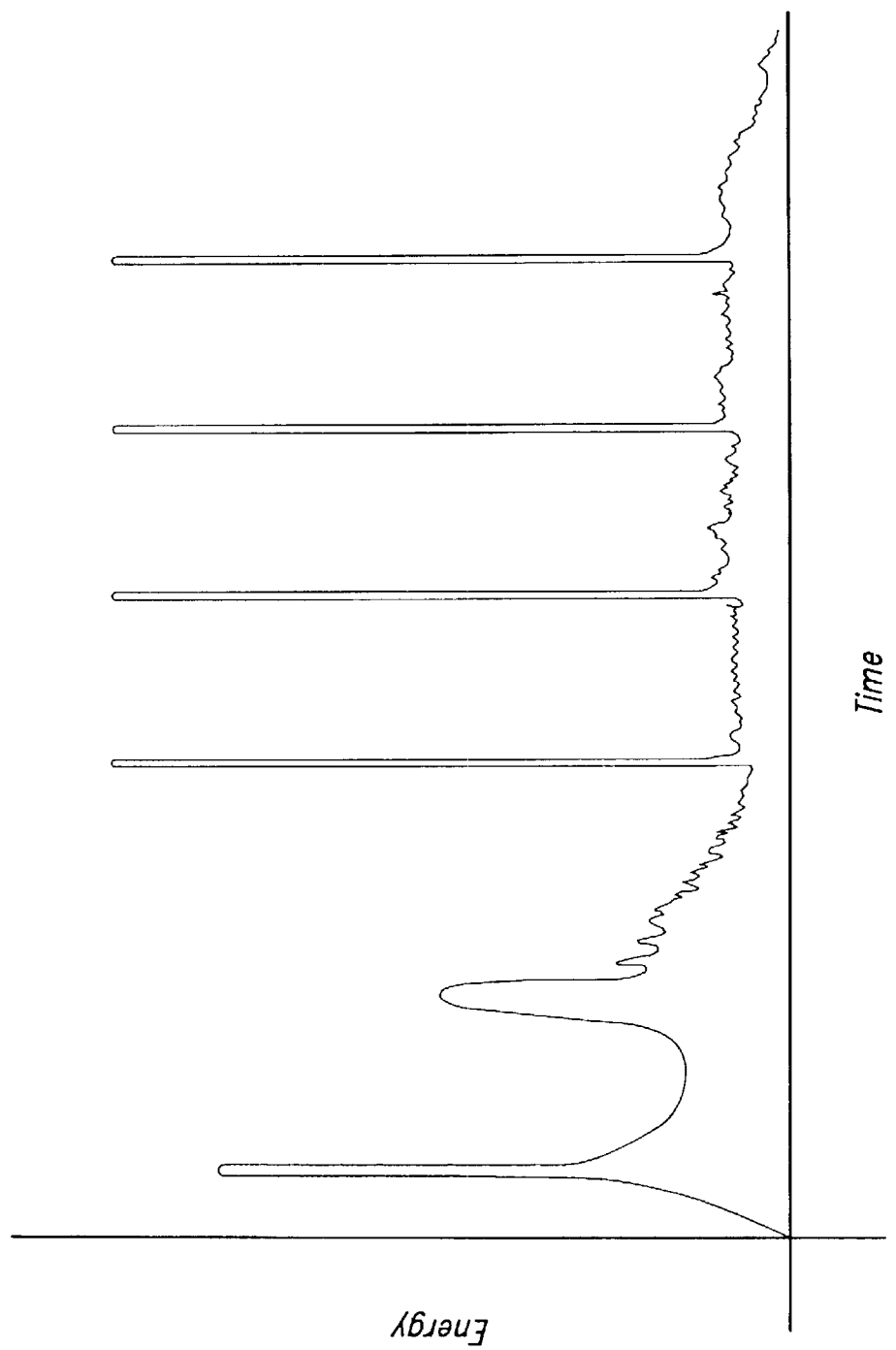
FIG. 1 is a graph of pulse energy vs. time for a typical spiked laser pulse produced according to a first embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention relates to a method and apparatus for using a pulsed laser beam to form precision apertures or holes in a workpiece. The apertures so formed have high tolerances regarding the shape and dimensions of both the entrance and exit surfaces, as well as of the shaft formed therebetween.

A series of precision laser pulses is used to penetrate a workpiece, producing an aperture therethrough characterized by, in this particular case, a right circular cylindrical shaft and substantially identical circular entrance and exit holes. The entrance and exit holes are preferably formed with tolerances of less than about 0.01 X relative to the hole diameter, and more preferably with tolerances of less than about 0.001 X.

As illustrated in FIG. 1, each precision laser pulse may be characterized as having a first relatively low energy portion and a second relatively high-energy portion characterized by at least one relatively high energy spike. Preferably, the second relatively high-energy portion includes at least two relatively high-energy spikes. More preferably, the high-energy spikes are substantially identical regarding their shapes and peak energies.

As the precision laser pulse interacts with the target workpiece, the first portion of the pulse serves to begin to desolidify (i.e., melt and/or vaporize and/or excite to form a plasma) the workpiece. The second portion of the precision laser pulse interacts with the desolidified matter to further energize the desolidified matter such that the desolidified matter is readily removed from the workpiece via the entrance aperture. Also, as the desolidified matter exits the workpiece surface, it is possible for the high-energy spikes to interact directly with the newly exposed workpiece surface such that more workpiece material is directly desolidified by the second portion of the pulse. Accordingly, the mechanism of penetration of the workpiece relies less on an explosion of pressurized gas erupting from the exit surface and more on direct desolidification of the exit surface via interaction (direct and/or indirect) with the precision laser pulse, resulting in precision machining of the workpiece to very high tolerances.

For example, right circular cylindrical apertures may be formed through a workpiece by orienting the laser source to impinge pulses onto the workpiece, wherein each pulse travels to the workpiece via a beam delivery from the laser oriented perpendicular to the workpiece. The laser pulse in this example is characterized by a first relatively low-energy portion and at least two subsequent relatively high-energy portions, although the pulse may have other shapes, such as that of a square-wave macro-pulse containing a plurality of spiked micro-pulses. The incident pulse first desolidifies a portion of the workpiece, and then energizes the desolidified portion to facilitate its departure from the surface of the workpiece. Each successive pulse therefore desolidifies and removes a successive portion of the workpieces, until a right circular cylindrical aperture is formed therethrough. The overall, or macro-, pulse duration and energy, as well as the duration, energy and spacing of each micro-pulse contained within the macro-pulse, as selected such that the duration of each macro/micro pulse is sufficiently short to prevent thermal damage or explosive release of pressurized gas from the workpiece and also such that the energy of each macro/micro pulse is sufficient to desolidify a portion of the workpiece during the duration of the pulse. Thus, the pulsed laser may be used to form right circular cylindrical apertures through a workpiece, such that the aperture is characterized by a substantially circular entry hole, a substantially circular exit hole, and a circular cylindrical opening extending therebetween. The entry and exit holes may be formed having tolerances of less than 0.01X and, more preferably, less than 0.001X. In other words, for an aperture of diameter X, the diameters of the entry and exit holes are preferably between 0.99X and 1.01X, and more preferably between 0.999X and 1.001X.

It should be recognized that apertures of various sizes, shapes and orientation may be made via the present invention. The aperture orientation is generally determined by angle of incidence between the laser beam and the workpiece, while the shape of the aperture is a function of various parameters, such as pulse pattern, energy, duration and spacing. The above discussion relates to right circular cylindrical apertures for convenience of description, and should not be interpreted as a limitation of the invention.

One method of producing the precision laser pulse (as illustrated in FIG. 2) includes modifying a high gain pulsed laser 10, such as a solid state diode pumped laser, to synchronize its RF driver 20 to a pump pulse generated by a pump pulse generator 25. This is shown schematically in FIGS. 3A–3C. The RF (or E.O.) driver 20 may drive a Q-switch or any convenient modulation device capable of providing similar operation. Such devices are typically electro-optic or acousto-optic in nature. The pump signal is preferably split such that a portion of the pump signal is routed to the RF driver 20 and a portion is routed to the lasing pump 30 (i.e., the diodes, lamps or the like used to create a population inversion or "pump" the laser). The RF driver 20 thus becomes synchronized with the pump pulse. The RF driver 20 produces the Q-switching (either A.O. or E.O.), which in turn produces a series of energy spikes within the "macro" laser pulse. The energy spikes are substantially identical in energy and shape.

Preferably, a delay generator 35 is connected between the pump signal generator 25 and the RF driver 20, such that the Q-switching effect may be delayed until after the initial energy surge characteristic of an unmodified pulse. In other words, the spiking or micro-pulsing may be delayed to take advantage of the natural relaxation surge that occurs in the first portion of an unmodified pulse produced by the laser. The spikes produced by this technique are regularly typically spaced in time.

Typically, laser pulses produced by the above-deseribed method have widths between about 50 microseconds and 20 milliseconds. The pulse widths available from a given laser system are partially dependent upon the choice of electronics incorporated into the system. For example, diode-pumped lasers typically produce pulses with durations from about 50 microseconds to about 1 millisecond, while lamp-pumped lasers typically produce longer pulses with durations lending towards 20 milliseconds. The micro-pulses or spikes formed within the overall macro-pulse have durations that are dependent upon the switching method (i.e., acousto-optic or electro-optic.) Electro-optically switched lasers micro-pulses may be as short as about 20 nanoseconds, while acousto-optical switching may be used to produce micro-pulses with durations from about 80 to about 300 nanoseconds. One preferred micro-pulse duration is about 100 nanoseconds, and such micro-pulses are preferably produced with an acousto-optically switched laser system. The durations of the micro-pulses are also gain and hold-off dependent, i.e. they are functions of the strength of the acousto-optic/electro-optic modulation.

The preferred pulse energy output of a typical laser system of the present invention is workpiece-dependent In other words, factors such as the workpiece material composition, specific material properties, the thickness of the workpiece, and the like must be considered when determining the optimum pulse energy delivered by the laser. Also important are the duty cycle of the laser and its maximum energy output. In general, thin materials require pulse energies in the millijoule range, while thicker materials require energies in the Joule range. One preferred micro-pulse energy is about 10 millijoule. Likewise, the micro-pulses typically have energies in the millijoule range, although they may have energies ranging from microjoules to Joules. The energies of the micro-pulses are likewise dependent upon the same workpiece and laser system factors as listed about regarding the pulse energies.

The preferred timing between pulses and the preferred timing between micro-pulses are likewise workpiece composition and laser system dependent, and are also dependent upon the duration and energy of each pulse. For example, for a given pulse duration and a given workpiece thermal conductivity, higher energy pulses may require greater lag times between pulses to allow dissipation of thermal energy within the workpiece. Likewise, for workpiece compositions that easily generate ablative clouds when laser-worked, longer lag times between pulses may be required to allow for dissipation of the ablative material. In short, the micro- and macro-pulse duration, energy, pattern sequencing and timing are interdependent upon each other as well as upon the workpiece material characteristics and are also governed by the energy output and duty cycle limitations of the particular laser system used to produce them. In one preferred embodiment, the time between micro-pulses is preferably between about 5 to about 20 microseconds, although it can vary from a few nanoseconds to milliseconds.

Figure 4:
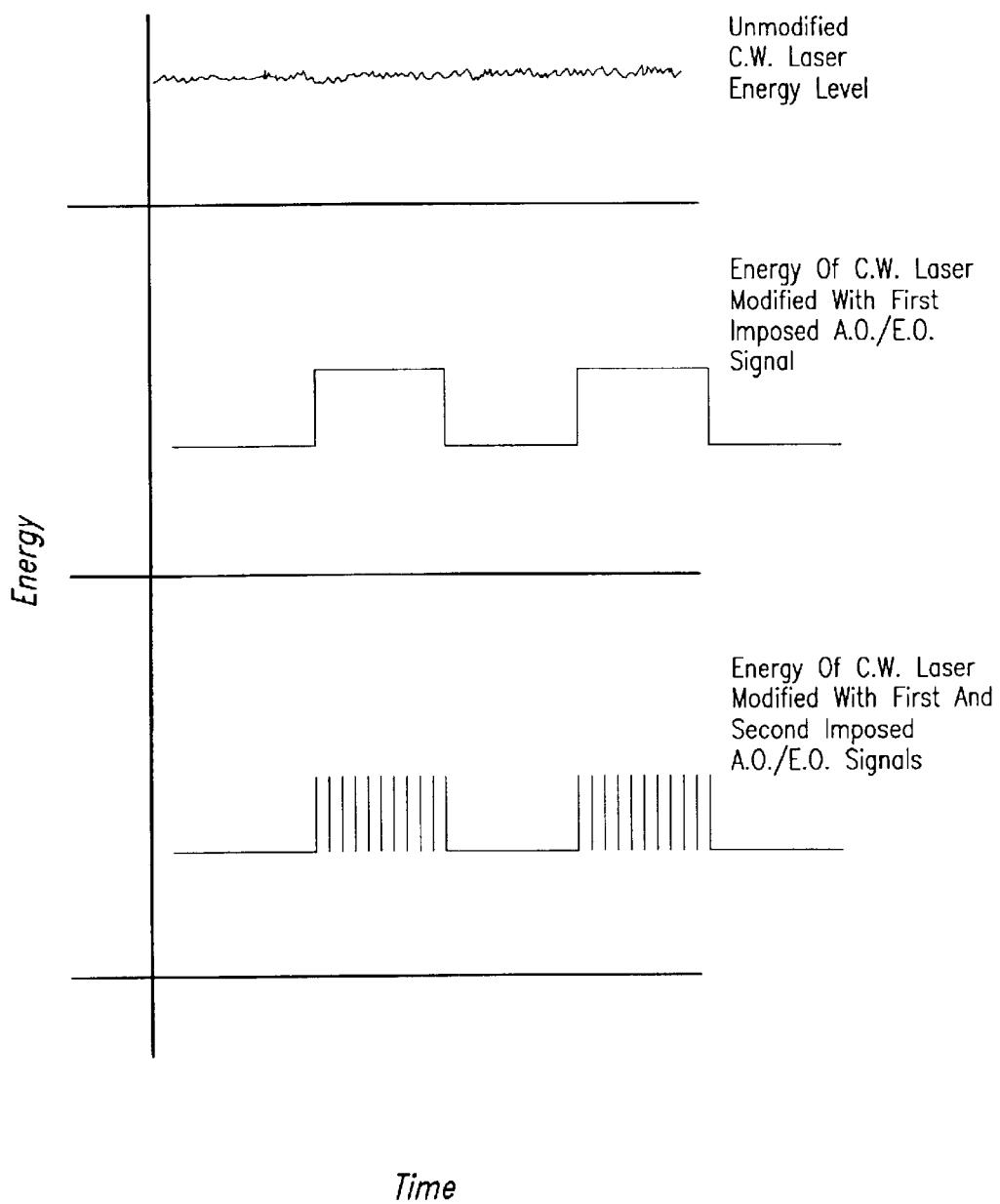
FIG. 4 is a graph illustrating the relationship between the output of an unmodified continuous wave laser, a continuous wave laser modified by a first Q-switching circuit, and a continuous wave laser modified by a first and a second Q-switching circuit.

A second method of producing a pulse having a series of internal spikes is illustrated in FIG. 4. This method relates to the modification of a continuous wave (C.W.) laser to produce a spiked pulse. Two A.O. signals are simultaneously imposed on the C.W. laser output, such that the first A.O. signal, if used alone, would produce a square-wave energy output pattern and the second A.O. signal superimposed upon the square wave output produces a spiked laser output pattern within the square wave output. This, in effect, produces a square-wave "pulse" characterized by a series of internal spikes. The above-described technique(s) are equally applicable to solid-state and/or Q-switched gaseous lasers.

The spiked pulse output has proven advantageous in producing high-precision cuts and/or holes in a variety of target workpiece materials. For example, highly reflective metallic targets have been easily cut despite their almost total reflectivity at the laser wavelengths. The entry and exit surfaces are cleaner due to the increased efficiency of material removal. Each spike has enough energy to desolidify or disintegrate target workpiece material, but is of such short duration that a cloud of material plasma or vapor does not form. Such clouds are unwanted, as they tend to temporarily block the beam, causing the beam to defocus above the workpiece. In other words, clouds of vaporized workpiece material absorb a portion of the beam, preventing that portion from striking and cutting through the intended workpiece. Moreover, the intercepted energy is transduced into heat by the cloud, resulting in superheated vapor/plasma debris at the workpiece surface. The superheated plasma/vapor may then cause more surface damage, such as uncontrolled melting and/or resolidification.

Further, ceramic materials have been cut with greatly reduced loss of strength. The spiked pulses deliver enough energy with each spike to vaporize some of the target material, but are short enough in duration so as not to unduly heat the surrounding ceramic workpiece. The result is efficient material disintegration and removal without undue heating, and attendant microcracking, of the workpiece.

Likewise, improved welds may be affected with a "spiked" laser pulse, since more target workpiece material is transformed due to the inherent "keyhole" formed during the incident laser pulse and it is also surmised that smoother weld surfaces should result from the tailoring of the trailing end of the pulse to soften the energy applied.

Moreover, such enhanced laser power output control lends itself to other fields where precise cutting with reduced damage to the surrounding material is required, such as medical, surgical, and dental applications.

While the invention has been illustrated and described in detail in the drawings and forgoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nearly infinite number of insubstantial changes and modification to the above-described embodiments and that it would be impractical to attempt to describe all such embodiment variations in the present specification. Accordingly, it is understood that all changes and modifications that come within the spirit of the invention are desired to be protected.

What is claimed is:

1. A method of forming a right circular cylindrical aperture through a workpiece, comprising the steps of:
    a) producing a laser pulse characterized by a first relatively low-energy portion and at least two subsequent relatively high-energy portions;
    b) shining the laser pulse onto the workpiece;
    c) desolidifying a portion of the workpiece;
    d) removing the desolidified material from the workpiece;
    e) repeating steps b), c), and d) until a right circular cylindrical aperture is formed through the workpiece;
        wherein the desolidified portion of the workpiece is removed prior to the formation of a cloud of desolidified material adjacent the workpiece;
        wherein the aperture is characterized by a substantially circular entry hole, a substantially circular exit hole, and a circular cylindrical opening extending therebetween;
        wherein the diameter of the circular cylindrical opening is X; and
        wherein the diameters of the entry and exit holes are between 0.99X and 1.01X.

2. The method of claim 1 wherein the diameters of the entry and exit holes are between 0.999X and 1.001X.

3. The method of claim 1 further comprising the steps of:
    f) before step c), softening a first surface of the workpiece;
    g) desolidifying the first surface of the workpiece; and
    h) removing the desolidified surface of the workpiece prior to step c) to form an entry hole.

4. The method of claim 1 further comprising the steps of:
    i) after step c), softening a second surface of the workpiece;
    j) desolidifying the second surface of the workpiece; and
    k) removing the desolidified surface of the workpiece to form an exit hole.

5. The method of claim 1 wherein the at least two subsequent relatively high-energy portions have substantially the same shape and energy.

6. The method of claim 1 wherein the laser pulse is shined perpendicular to the workpiece.

7. The method of claim 1 wherein the laser pulse has a duration of between about 50 microseconds and about 20 milliseconds.

8. The method of claim 7 wherein the laser pulse has a duration of between about 50 microseconds and 1 millisecond.

9. A method for producing a precision-machined workpiece using a pulsed laser assembly, comprising the steps of:
   a) producing a laser pulse with the pulsed laser assembly; and
   b) directing the laser pulse through the workpiece;
      wherein the laser pulse further comprises:
         a first relatively low energy portion; and
         at least two relatively high energy micro-pulses subsequent to the first relatively low energy portion; and
      wherein the pulsed laser assembly further comprises:
         a pulse generator;
         a lasing pump operationally connected to the pulse generator; and
         at least one switch operationally connected to the pulse generator and the lasing pump;
         wherein the at least one switch is synchronized with the pump pulse;
         wherein the at least one switch actuates the separation of the laser pulse into a plurality of discrete micro-pulses.

10. The method of claim 9 further comprising the steps of:
   a. before step b), softening a first surface of the workpiece;
   b. after step c), forming a circular entry hole in the workpiece;
   c. repeating step b) until a circular cylindrical aperture is formed through the workpiece;
      wherein the laser pulse
   d. after step e), softening a second surface of the workpiece;
   e. after step c), forming a circular exit hole in the workpiece;
      wherein the diameters of the entry and exit holes have tolerances of less than 0.01 times the diameter of the circular cylindrical aperture.

11. The method of claim 10 wherein the diameters of the entry and exit holes have tolerances of less than 0.001 times the diameter of the circular cylindrical aperture.

12. The method of claim 9 wherein the workpiece is metal.

13. The method of claim 9 wherein the workpiece is ceramic.

14. The method of claim 13 wherein the energy of each micro-pulse is sufficient to desolidify a portion of the workpiece and wherein the duration of each micro-pulse is short enough to substantially prevent damage to the workpiece through thermal shocking.

15. The method of claim 14 wherein the energy of each micro-pulse is about 10 millijoules.

16. The method of claim 9 wherein the duration of each pulse is between about 50 microseconds and about 20 milliseconds.

17. The method of claim 16 wherein the duration of each pulse is between about 50 microseconds and about 1 millisecond.

18. The method of claim 9 wherein the duration of each micro-pulse is between about 20 nanoseconds and about 300 nanoseconds.

19. The method of claim 18 wherein the duration of each micro-pulse is between about 80 nanoseconds and about 300 nanoseconds.

20. The method of claim 19 wherein the duration of each micro-pulse is about 100 nanoseconds.

21. The method of claim 9 wherein the interval between each micro-pulse is between about 5 microseconds and about 20 microseconds.

22. A method for producing a laser pulse for the precision machining of a workpiece using a continuous laser source, comprising the steps of:
   a) producing a continuous wave output laser beam;
   b) simultaneously imposing a first Q-switched signal and at least a second Q-switched signal onto the continuous wave output;
      wherein the imposition of the first Q-switched signal produces a laser beam characterized by a square-wave pseudo-pulse output pattern; and
      wherein the imposition of the at least a second Q-switched signal produces a laser beam characterized by a spiked output pattern within a pseudo-pulse.

23. The method of claim 22 wherein the Q-switched signals are acousto-optic.

24. The method of claim 22 wherein the Q-switched signals are electro-optic.

25. The method of claim 22 wherein the continuous laser source is a solid-state laser.

26. The method of claim 22 wherein the continuous laser source is a gaseous laser.

27. The method of claim 22 wherein the duration of each pseudo-pulse is between about 5 microseconds and about 20 microseconds.

28. A method for producing a laser pulse using a pulsed laser system having at least one modulation device operationally connected to gain media/a laser lamp and a pulse generator providing a pulse both to the at least one modulation device and to the laser lamp, for the precision machining of a workpiece, comprising the steps of:
   a) generating a pulse signal;
   b) splitting the pulse signal;
   c) diverting a first portion of the pulse signal to the laser lamp;
   d) diverting a second portion of the pulse signal to the at least one modulation device;
   e) synchronizing the at least one modulation device to the to the pulse signal;
   f) generating a laser macro-pulse from the laser lamp;
      wherein the laser pulse is characterized by a plurality of discretely separated energy micro-pulses of substantially similar energy and configuration contained within the laser pulse.

29. The method of claim 28 wherein the laser pulse is further characterized as a square wave containing a plurality of discretely separated energy micro-pulses of substantially similar energy and configuration contained within the laser pulse.

30. The method of claim 28 wherein the laser pulse is further characterized by a first relatively low-energy micro-pulse preceding the plurality of discretely separated energy micro-pulses.

31. The method of claim 28 wherein each micro-pulse of the plurality of micro-pulses is further characterized by a first duration and wherein the first relatively low-energy micro-pulse has a second duration substantially greater than the first duration.

32. The method of claim 28 wherein the duration of each pulse is between about 50 microseconds and about 20 milliseconds.

33. The method of claim 32 wherein the duration of each pulse is between about 50 microseconds and about 1 millisecond.

34. The method of claim 28 wherein the duration of each micro-pulse is between about 20 nanoseconds and about 300 nanoseconds.

35. The method of claim 34 wherein the duration of each micro-pulse is between about 80 nanoseconds and about 300 nanoseconds.

36. The method of claim 35 wherein the duration of each micro-pulse is about 100 nanoseconds.

37. The method of claim 28 wherein the interval between each micro-pulse is between about 5 microseconds and about 20 microseconds.

* * * * *